United States Patent
Muralidharan et al.

(10) Patent No.: US 11,833,587 B2
(45) Date of Patent: Dec. 5, 2023

(54) METAL POWDER FUSION MANUFACTURING WITH IMPROVED QUALITY

(71) Applicant: LAYERWISE NV, Leuven (BE)

(72) Inventors: Gokula Krishna Muralidharan, Ghent (BE); Jonathan Watson, Santa Monica, CA (US); Wim Hermans, Schaarbeek (BE); Bas Verhagen, Heist-op-den-Berg (BE)

(73) Assignee: LAYERWISE NV, Leuven (BE)

( * ) Notice: Subject to any disclaimer, the term of this patent is extended or adjusted under 35 U.S.C. 154(b) by 330 days.

(21) Appl. No.: 17/174,469

(22) Filed: Feb. 12, 2021

(65) Prior Publication Data

US 2021/0260664 A1  Aug. 26, 2021

Related U.S. Application Data

(60) Provisional application No. 62/978,929, filed on Feb. 20, 2020.

(51) Int. Cl.
*B22F 10/73* (2021.01)
*B33Y 10/00* (2015.01)
(Continued)

(52) U.S. Cl.
CPC .............. *B22F 10/73* (2021.01); *B22F 10/28* (2021.01); *B22F 12/38* (2021.01); *B22F 12/70* (2021.01);
(Continued)

(58) Field of Classification Search
CPC .......... B22F 10/73; B22F 12/38; B22F 12/70; B22F 10/28; B33Y 10/00; B33Y 40/00; B33Y 30/00; B23K 26/342; B23K 26/123
See application file for complete search history.

(56) References Cited

U.S. PATENT DOCUMENTS

2016/0361874 A1  12/2016  Park et al.

FOREIGN PATENT DOCUMENTS

| EP | 1700686 | 9/2006 |
|----|---------|--------|
| GB | 2658521 | 5/2019 |

(Continued)

OTHER PUBLICATIONS

European Office Action for European Patent Patent Application No. 21158317.4, dated Jun. 18, 2021 (8 pages).

*Primary Examiner* — Anthony M Liang
*Assistant Examiner* — Danny N Kang

(57) ABSTRACT

A method of manufacturing a three-dimensional article is provided for a system including a powder handling module containing stored metal powder. The stored metal powder includes used metal powder that was previously part of the metal powder loaded into a print engine during a previous fabrication process. The method includes (1) loading a volume of the metal powder into an agitation device, (2) operating the agitation device until an avalanche angle of the metal powder is modified to within a specified range to provide a volume of usable metal powder, (3) loading the usable metal powder into a three-dimensional print engine, and (4) operating the print engine to fabricate a the three-dimensional article. This process improves coating quality within the print engine. Improving coating quality improves dimensional accuracy of the three-dimensional article along with reducing defects resulting from coating artifacts.

12 Claims, 3 Drawing Sheets

(51) Int. Cl.
*B33Y 40/00* (2020.01)
*B33Y 30/00* (2015.01)
*B22F 12/70* (2021.01)
*B23K 26/342* (2014.01)
*B22F 12/00* (2021.01)
*B22F 10/28* (2021.01)
*B23K 26/12* (2014.01)

(52) U.S. Cl.
CPC ............ *B23K 26/342* (2015.10); *B33Y 10/00* (2014.12); *B33Y 40/00* (2014.12); *B23K 26/123* (2013.01); *B33Y 30/00* (2014.12)

(56) References Cited

FOREIGN PATENT DOCUMENTS

| | | |
|---|---|---|
| WO | 2017005301 | 1/2017 |
| WO | 2018056988 | 3/2018 |

METAL POWDER FUSION MANUFACTURING WITH IMPROVED QUALITY

CROSS-REFERENCE TO RELATED APPLICATIONS

This non-provisional patent application claims priority to U.S. Provisional Application Ser. No. 62/978,929, Entitled "METAL POWDER FUSION MANUFACTURING WITH IMPROVED QUALITY" by Gokula Krishna Muralidharan et al., filed on Feb. 20, 2020, incorporated herein by reference under the benefit of U.S.C. 119(e).

FIELD OF THE INVENTION

The present disclosure concerns a method of manufacturing three-dimensional metal articles using a layer-by-layer fusion of metal powder. More particularly, the present disclosure concerns a way of providing a more dimensionally accurate and defect-free way of forming metal powder layers.

BACKGROUND

Three dimensional (3D) printing systems are in rapidly increasing use for purposes such as prototyping and manufacturing. One type of three dimensional printer utilizes a layer-by-layer fusion process to form a three dimensional article of manufacture from metal powder. For each layer, a metal powder layer is formed proximate to a build plane and an energy beam such as a laser or electron beam is use to selectively fuse the layer. Once challenge with these systems are defects formed during the formation of the metal powder layers.

SUMMARY

Figure 1:
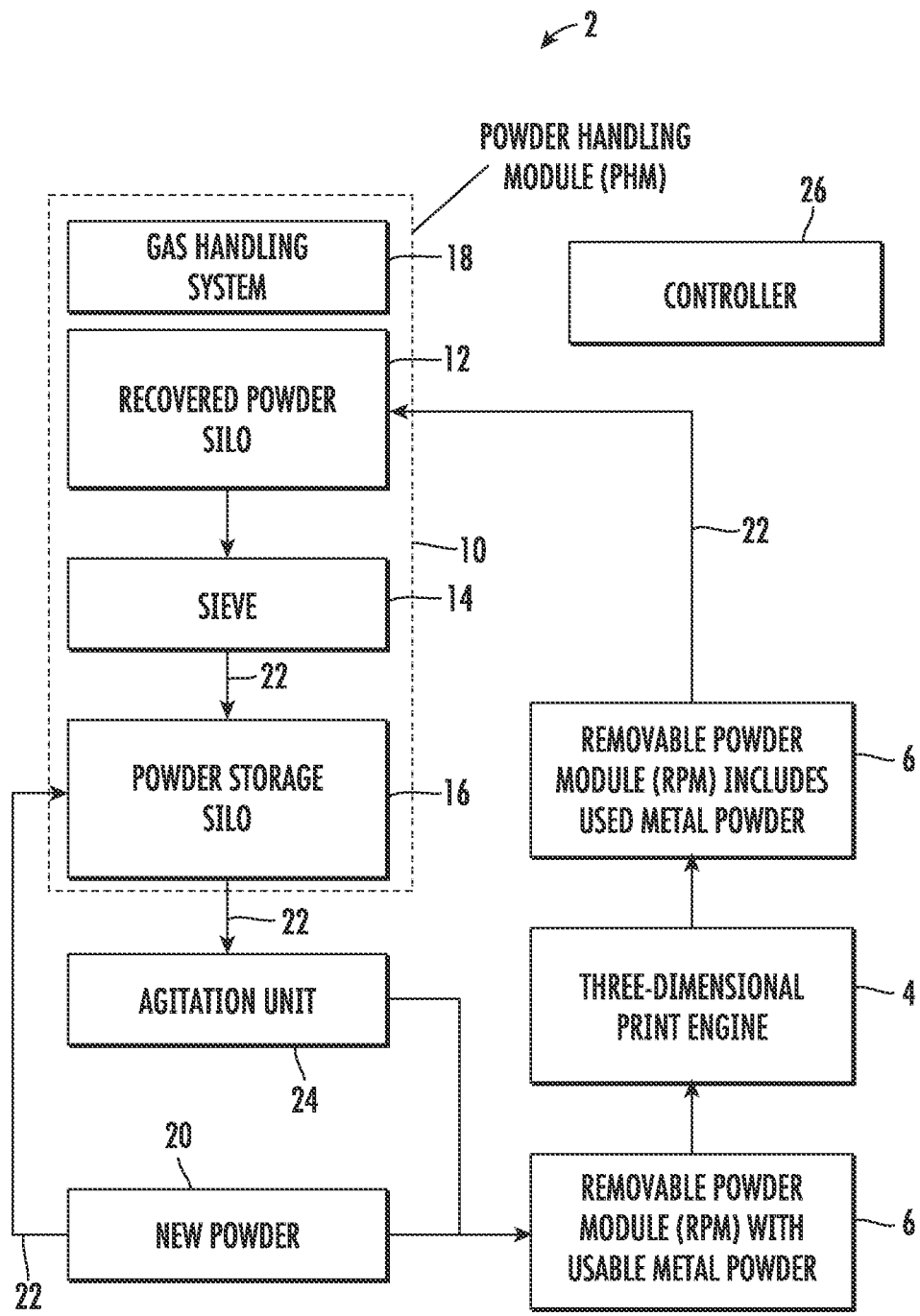
FIG. 1 is a schematic diagram depicting an embodiment of a three-dimensional printing system for manufacturing three-dimensional articles from metal powder.

In an aspect of the invention, a method of manufacturing a three-dimensional article is provided for a system including a powder handling module containing stored metal powder. The stored metal powder includes used metal powder that was previously part of the metal powder loaded into a print engine during a previous fabrication process. The method includes (1) loading a volume of the stored powder into an agitation device, (2) operating the agitation device until an avalanche angle of the metal powder is modified to within a specified range to provide a volume of usable metal powder, (3) loading the usable metal powder into a three-dimensional print engine, and (4) operating the print engine to fabricate the three-dimensional article. It is desirable to reduce the avalanche angle of the powder which in turn improves powder coating uniformity. Improved powder coating uniformity reduces surface defects and improves dimensional accuracy for the three-dimensional article.

In one implementation the powder handling module includes a recovered powder silo, a sieve, and a powder storage silo. The method further includes transporting used metal powder into the recovered powder silo, passing the used metal powder through the sieve to provide used and sieved metal powder, and then transporting the used and sieved metal powder into a powder storage silo. The powder storage silo then contains stored metal powder that includes the used and sieved metal powder along with metal powder that was previously in the powder storage silo. The stored metal powder can be a mixture of used and sieved metal powder and new and unused metal powder from a powder supplier.

In another implementation, the powder handling module transports powder by along a tube by entraining the metal powder in a moving inert gas. The powder handling module can include an inert gas source and a vacuum for generating motion of the inert gas for entrainment. This gas entrainment transportation can adversely increase the avalanche angle.

In yet another implementation, the agitation device includes one or more of a stirring device, an ultrasonic transducer, and a motorized vibratory device. Thus, agitation is generic for one or more of stirring or vibrating. The duration of operation is defined as a time during which the metal powder is agitated. The duration time is for one hour or more. The duration time can be equal to or greater than 3 hours, 6 hours, 9 hours, 12 hours, 18 hours, 20 hours, 24 hours, 30 hours, and 40 hours. The duration time depends upon a batch size being agitated and upon a degree to which modifying and controlling the avalanche angle is desired. A longer duration and lower intensity agitation has been found to provide a reduced and consistent avalanche angle.

In a further implementation, the specified range of the avalanche angle is within an overall range of zero to fifty degrees. The avalanche angle can be determined before, during, or after the agitation. Determination can be accomplished by directly measuring the avalanche angle or indirectly by measuring an angle of repose.

DETAILED DESCRIPTION OF THE PREFERRED EMBODIMENTS

FIG. 1 is a schematic diagram depicting an embodiment of a three-dimensional printing system 2 for manufacturing three-dimensional articles from metal powder. This diagram is intended to depict the movement of metal powder between components of system 2.

System 2 includes a print engine 4 that forms the three-dimensional articles through selective fusion of layers of the metal powder. The print engine 4 includes a removable powder module (RPM) 6. After the print engine 4 is operated to form a three-dimensional article, the RPM 6 then contains a three-dimensional article that is surrounded by used or unfused metal powder. The term "used" metal powder is defined as metal powder that resides in and around a three-dimensional article during and after fabrication of the three-dimensional article.

The unfused metal powder 8 can then be transported into a powder handling module (PHM) 10. In the illustrated embodiment, the PHM 10 includes a recovered powder silo 12, a sieve 14, and a powder storage silo 16. The PHM also includes a gas handling system 18.

The recovered powder silo 12 is configured to receive the used metal powder from the RPM 6. The sieve 14 is configured to remove fused or agglomerated portions of the used powder. The powder storage silo 16 receives the used and sieved powder from sieve 14 as well as new metal powder from new powder supply 20 that may come directly from a metal powder manufacturer. Thus, the powder storage silo 16 typically stores both used and sieved powders from previous operations of the print engine 4 as well as new powder from a new powder supply 20. New powder is defined as metal powder from a powder manufacturer that has not yet resided in a three-dimensional print engine 4 during fabrication of a three-dimensional article.

The gas handling system (GHS) 18 is used to maintain an inert or non-oxidizing atmosphere within the PHM 10. The GHS 18 can include a source of inert gas such as nitrogen or argon, a vacuum source, controllable valves, sensors, and other features. In the illustrated embodiment, the metal powder (used, sieved, new, mixture) is transported to, from, and within the PHM by entrainment in moving inert gas. The vacuum source along with controllable valves are used to generate a velocity of the inert gas to entrain and transport the metal powder through tubes 22. For some embodiments of system 2, the transport of the powder can be partly or completely under a force of gravity. For example, transferring of powder between sieve 14 or to the removable powder module (RPM) can be partly or completely driven by a force of gravity.

As discussed supra, the powder storage silo 16 stores metal powder from more than one source including new and used metal powder. The stored metal powder may have an increase or variations in an avalanche angle due to effects of operation of the print engine 4, recovery from the RPM 6, and transport through the tubes 22. The increased and/or variability in avalanche angle can adversely affect coating uniformity when the print engine 4 is operated.

An agitation unit 24 is configured to receive a volume of the stored metal powder from the powder storage silo 16 sufficient to at least fill an empty RPM 6 or to recharge a print engine 4. The agitation unit 24 includes one or more of a stirring device, an ultrasonic device, and a motor-driven vibratory device. The agitation device 24 operates to reduce an avalanche angle of the metal powder and to reduce an overall range of the avalanche angle.

In an embodiment, the agitation device includes a bucket with a motorized stir bar. The gas handling system 18 is coupled to the bucket to maintain a non-oxidizing atmosphere in the bucket. The motorized stir bar is configured to stir the powder contained within the bucket.

A controller 26 is coupled to various portions of system 2. Controller 26 can include a single physical controller or multiple controllers as desired. Controller 26 includes a processor coupled to an information storage device. The information storage device stores software instructions. When executed by the processor, the software instructions can operate portions of PHM 10, new powder supply 20, agitation unit 24, and other portions of system 2. As stated earlier, controller 26 may actually be a plurality of controllers 26 that are dedicated to individual portions of system 2 which can operate either cooperatively or independently.

Figure 2:
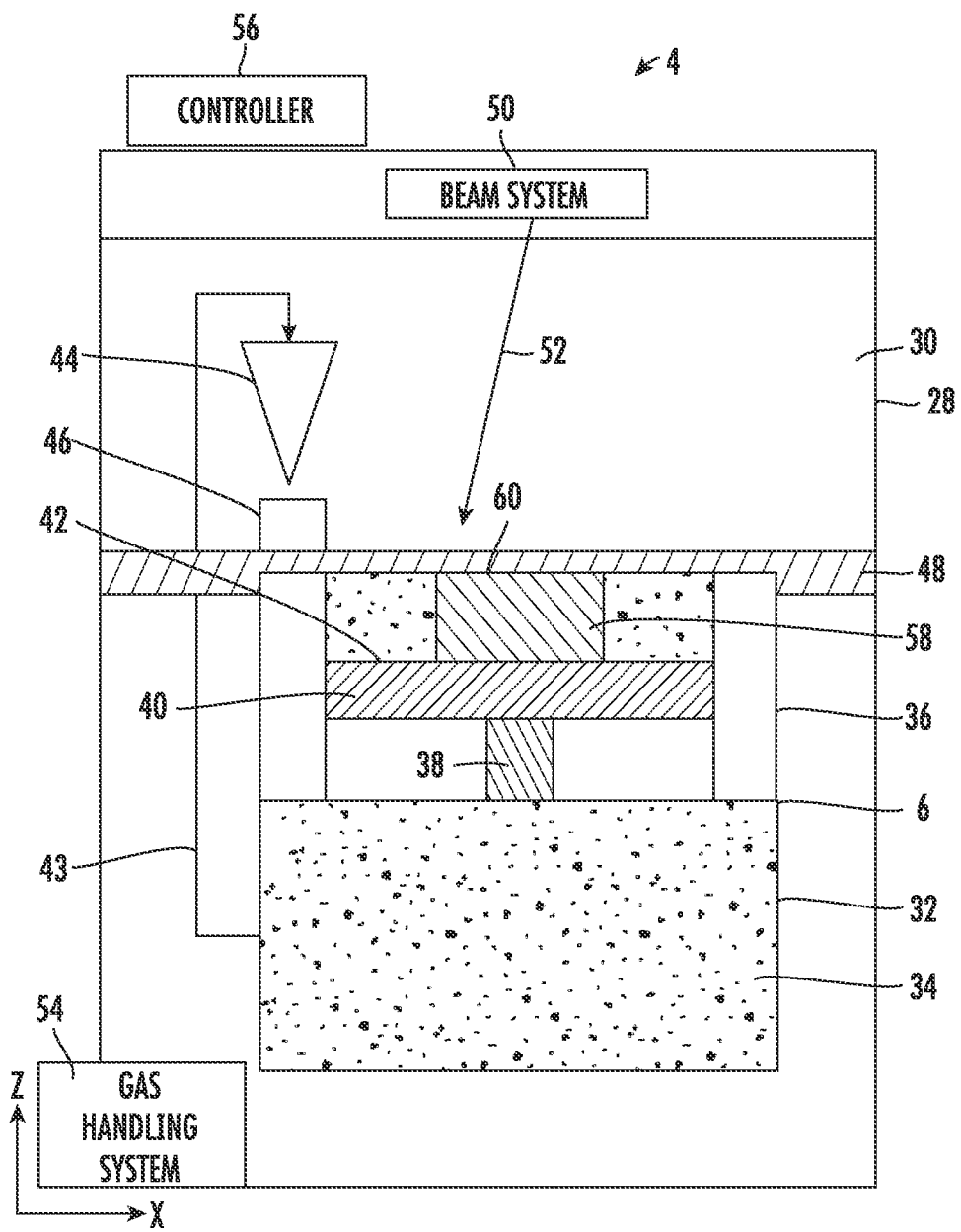
FIG. 2 is a schematic diagram of an embodiment of a print engine.

FIG. 2 is a schematic diagram of an embodiment of a print engine 4. In describing print engine 4, a lateral axis X and vertical axis Z can be used. Print engine 4 includes an outer housing 28 that encloses a process chamber 30. Within the process chamber 30 is the RPM 6.

A lower portion or vessel 32 of the RPM 6 contains metal powder 34. An upper portion or vessel 36 of RPM 6 contains a vertical movement actuator 38 coupled to a platen 40. The vertical movement actuator 38 is configured to vertically position an upper surface 42 of platen 40.

A powder transport 43 is coupled between the lower vessel 32 and a dispensing hopper 44. The powder transport 43 can include one or more motorized augers that rotationally transport the powder from the lower vessel 32 to the dispensing hopper 44. The dispensing hopper 44 dispenses the powder into a coater 46. The coater 46 is configured to scan in X along a horizontal support 48 while depositing layers of metal powder 34 over or above the upper surface 42. Besides scanning and depositing metal powder 34 layers, the coater 46 periodically moves to a position under the dispensing hopper 44 to be recharged (refilled) with metal powder 34.

Above the chamber 30 is a beam system 50 for generating an energy beam 52 for selectively fusing deposited layers of the metal powder 34. The energy beam 52 can be a laser beam or a particle beam. When beam 52 is a laser beam, optical beam power levels tend to be at least about 100 watts or more, 500 watts or more, or about 1000 watts for melting layers of metal powder 34. The beam system 50 can be configured to generate a plurality of different energy beams 52 that operate in parallel to increase productivity of the print engine 4.

A gas handling system 54 includes a vacuum pump and a supply of inert gas such as nitrogen or argon. In an illustrative embodiment, the process chamber 30 is shielded from a laser system 50.

A controller 56 is coupled to various portions of the print engine 4. Controller 56 includes a processor coupled to an information storage device. The information storage device stores software instructions. When executed by the processor, the software instructions can operate portions of the print engine 4 including the RPM 6. Operation of the controller 56 can perform various operations including fabricating a three-dimensional article 58 in a layer-by-layer manner from powder 34.

As such controller 56 is configured to: (1) Operate the gas handling system 54 to evacuate chamber 30 and to backfill chamber 30 with an inert gas (e.g., nitrogen or argon), (2) operate actuator 38 to position upper surface 42 proximate to a build plane 60, (3) operate coater 46 to dispense a layer of powder 34 on upper surface 42 defining the build plane 60, (4) operate beam system 50 to selectively melt and thus fuse the layer of powder dispensed to form a layer of article 58, (5) repeat (2)-(4) to form additional layers of the three-dimensional article 58. In repeating step (2), a top surface of the article 58 is positioned proximate to the build plane 60. During or between steps (2)-(4), the controller 56 is configured to operate the coater 46, dispensing hopper 44, and powder transport 43 as needed to recharge the coater 46 and maintain a supply of powder 34 in the dispensing hopper 44. After the three-dimensional article 58 is formed, the controller 56 can operate portions of the print engine 4 to allow the RPM 6 to be unloaded from the chamber 30. Controller 56 can also monitor sensors and operate other portions of print engine 4 not described.

Figure 3:
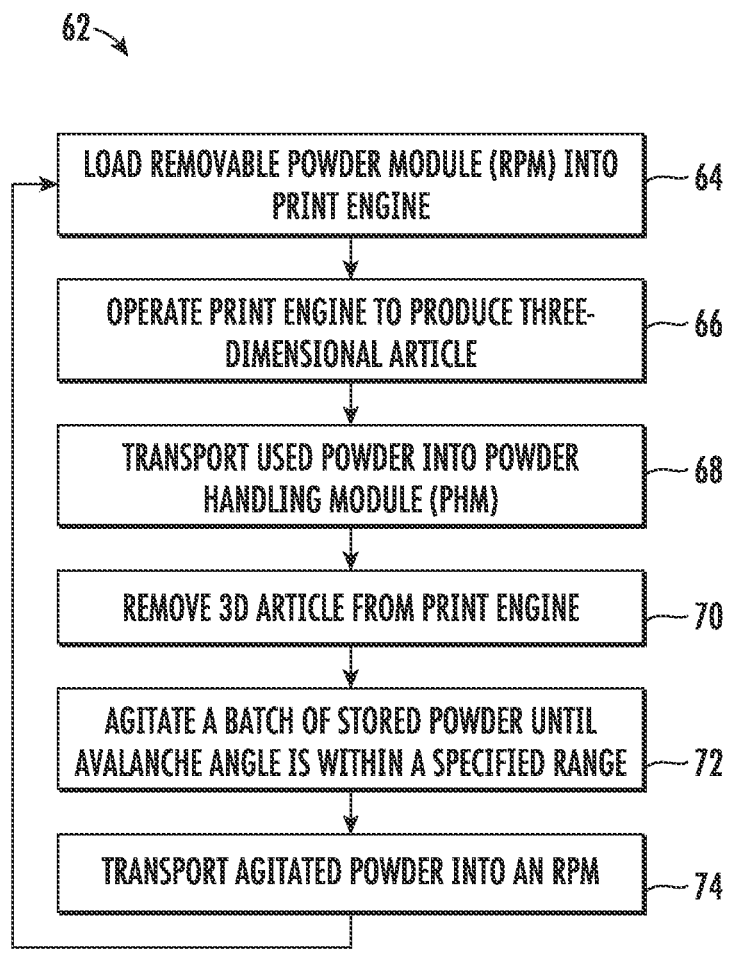
FIG. 3 is a flowchart of an embodiment of a method for manufacturing three-dimensional articles.

FIG. 3 is a flowchart of an embodiment of a method 62 for operating system 2 for manufacturing three-dimensional articles 58. At least some of the method steps are performed by controller 26 which can include controller 56.

According to 64, a removable powder module (RPM) 6 is loaded into the print engine 4. According to 66, the print engine 4 is operated to produce the three-dimensional article 58. According to 68, used powder is transported from the print engine 4 to the powder handling module (PHM) 10. According to 70, the three-dimensional article 58 is removed from the print engine 4.

According to the PHM 10 embodiment of FIG. 1, step 68 includes transporting the used powder into recovered powder silo 12, passing the powder through sieve 14, and transporting the now used and sieved powder into the powder storage silo 16 which may already include used powder from earlier fabrication processes and new powder from a new powder supply 20. The combination of metal powders stored in powder storage silo 16 can be referred to as "stored metal powder."

According to 72, a batch of the stored metal powder from the PHM is agitated until an avalanche angle for the powder is within a specified range. As part of step 72, an angle of repose or avalanche angle can be measured one or more times to find out starting values and to monitor progress.

In some embodiments, the agitation process duration is an hour or more depending upon the type of agitation employed. For some types of agitation, the duration may be 5 hours or more, 10 hours or more, 30 hours or more, or up to 40 hours.

When the agitation includes stirring of the metal powder, the stirring is effective at certain rotation rates below about 80 revolutions per minute (RPM). A stirring rotation rate of about 20 RPM for about 12 hours has been found to be effective. When the agitation includes vibration, a vibration frequency of about 600 Hertz (Hz) for 12 hours has been found to be effective. Agitation in an inert gas appears to be somewhat better than agitation in air.

Less aggressive agitation for longer times have been found to be optimal for the quality of usable metal powder. Stirring between 5 to 15 RPM for 40 hours has produced the best results but at the expensive of a longer cycle time. Tests that have been run are based on a limited range of sample sizes and materials. The optimal time and rotation rate may vary with batch size, specific metal used, and other factors.

The specified range of the avalanche angle is within an overall range of zero to 50 degrees. The specified range is likely to be narrower however based upon a type of coater 46 and coating process used.

The avalanche angle can be determined by direct measurement or indirectly by measuring an angle of repose. The angle of repose is approximately 2 degrees less than the avalanche angle. Methods of measuring angle of repose and avalanche angle are generally known.

According to step 74—after the metal powder has been sufficiently agitated, the resultant agitated powder is loaded into an empty RPM 6. Then the RPM 6 can be loaded into the print engine—looping back to step 64.

In an alternative embodiment to FIGS. 1-3, the overall system may not have an RPM. Then the metal powder would be directly transferred from the PHM to and from the print engine 4. Otherwise, the agitation process (element 24 of FIG. 1 and element 72 of FIG. 3) would be the same. In some embodiments, vessel 32 and vessel 36 can be separate vessels (not part of one module or RPM) and can have various locations within the print engine 4.

Thus, the specific embodiments and applications thereof described above are for illustrative purposes only and do not preclude modifications and variations encompassed by the scope of the following claims.

What is claimed:

1. A method of manufacturing a three-dimensional article comprising:
   (1) operating a three-dimensional printer to form a first three-dimensional article through the selective fusion of layers of metal powder in a build container with a volume of used but unfused metal powder remaining in the build container after the selective fusion of layers;
   (2) transporting the used metal powder from the build container to a powder handling module;
   (3) operating the powder handling module including storing the used metal powder to provide stored metal powder;
   (4) transporting a volume of the stored metal powder to an agitation device;
   (5) operating the agitation device to modify an avalanche angle of the metal powder to within a specified range to provide usable metal powder, the avalanche angle is a measurable material property of the metal powder, the specified range is within a range of 1 to 50 degrees;
   (6) load the usable metal powder into the three-dimensional printer; and
   (7) operate the three-dimensional printer to form a second three-dimensional article.

2. The method of claim 1 wherein the power handling module includes a gas handling system including a source of inert gas and a vacuum source, operating the powder handling module includes transporting the used metal powder through a tube by entraining the metal powder in a flow of the inert gas.

3. The method of claim 1 wherein step (2) includes transporting the used metal powder from the build container to a recovered powder silo within the powder handling module.

4. The method of claim 3 wherein step (3) includes transporting the used metal powder from the recovered powder silo, through a sieve, and to a powder storage silo.

5. The method of claim 4 further comprising transporting new unused metal powder into the powder storage silo.

6. The method of claim 1 wherein agitation device includes one or more of a stirring device, an ultrasonic transducer, and a motorized vibratory device.

7. The method of claim 1 wherein operating the agitation device includes agitating the metal powder for at least three hours.

8. The method of claim 1 further comprising determining the avalanche angle of the volume of metal powder before, during, and/or after step (5).

9. The method of claim 1, wherein step (6) includes:
   loading the agitated metal powder into a removable powder module (RPM); and
   loading the RPM into the three-dimensional printer.

10. A method of manufacturing a three-dimensional article comprising:
    (1) operating a three-dimensional printer to form a first three-dimensional article through the selective fusion of layers of metal powder in a build container with a volume of used but unfused metal powder remaining in the build container after the selective fusion of layers;
    (2) transporting the used metal powder from the build container to a powder handling module;
    (3) operating the powder handling module including storing the used metal powder to provide stored metal powder;
    (4) transporting a volume of the stored metal powder to an agitation device;
    (5) operating the agitation device for at least an hour to reduce an overall range of an avalanche angle of the metal powder, the avalanche angle is a measurable material property of the metal powder, the overall range of the avalanche angle is within a range between 1 and 50 degrees;
    (6) load the usable metal powder into the three-dimensional printer; and
    (7) operate the three-dimensional printer to form a second three-dimensional article.

11. The method of claim 10 wherein operating the agitation device includes operating the agitation device for more than 5 hours.

12. The method of claim 10 wherein operating the agitation device includes operating the agitation device for more than 10 hours.

\* \* \* \* \*